(12) United States Patent
Wu

(10) Patent No.: US 6,257,269 B1
(45) Date of Patent: Jul. 10, 2001

(54) MULTIPLE-PURPOSED AIR VALVE COMPONENT FOR AIR MATTRESS

(76) Inventor: Shang-Neng Wu, No 81, Rong Xing Street, Ping Zhen City, Tao Yuan. (TW)

( * ) Notice: Subject to any disclaimer, the term of this patent is extended or adjusted under 35 U.S.C. 154(b) by 0 days.

(21) Appl. No.: 09/563,579

(22) Filed: May 3, 2000

(51) Int. Cl.[7] ................................................. F16K 15/20
(52) U.S. Cl. ..................... 137/224; 251/346; 137/512.1
(58) Field of Search .................................. 137/224, 523, 137/512.1, 516.11; 251/346

(56) References Cited

U.S. PATENT DOCUMENTS

| | | | |
|---|---|---|---|
| 1,539,127 | * | 5/1925 | Lipman ............................ 137/512.1 |
| 4,694,515 | * | 9/1987 | Rogers, Jr. ....................... 137/223 X |
| 4,995,124 | * | 2/1991 | Wridge, Jr. et al. .................... 5/709 |
| 5,090,880 | * | 2/1992 | Mashimo ....................... 137/512.1 X |
| 5,544,688 | * | 8/1996 | Freigang et al. ................. 137/224 X |

* cited by examiner

Primary Examiner—John Rivell
Assistant Examiner—Meredith H. Schoenfeld
(74) Attorney, Agent, or Firm—Pro-Techtor International Services

(57) ABSTRACT

The present invention relates to a multiple-purposed air valve component for air mattress. The air valve is designed mainly for rapid injection and release of air for the air mattress. This invention can be incorporated with electric exhaust (intake) fan for rapid injection and release of air. In particular, the present invention is the first device of which the air valve can be opened and closed by winding, thereby ensures the correct motion. When it is switched to the release position, the air inside the mattress will be released rapidly to facilitate the execution of CPR. The additional function of automatic pressure release makes this device a practical and innovating one.

4 Claims, 7 Drawing Sheets

MULTIPLE-PURPOSED AIR VALVE COMPONENT FOR AIR MATTRESS

BACKGROUND OF THE INVENTION

1. Field of the Invention

The present invention relates to a multiple-purposed air valve that allows rapid injection of air into air mattress and rapid release of air from air mattress, and can be incorporated with electric exhaust (intake) fan to inject air and release air and release pressure automatically.

2. Description of the Prior Art

This invention is a multiple-purposed air valve component for air mattress, referring to a multiple-purposed air valve device that allows rapid injection and release of air and can be incorporated with electric exhaust (intake) fan to inject and release air as well as automatic release of pressure.

SUMMARY OF THE INVENTION

The air mattress is used mainly as a device to prevent decubitus from occurring to the long bed-ridden patients. Most users of such air mattress are patients suffering from major illness. As such, following concerns need to be addressed properly:

1. When CPR becomes pertinent to deal with a patient's critical condition, releasing air from the air mattress is of vital importance.
2. The conventional pump takes approximately 40 minutes to inject air into air mattress. Then an exhaust (intake) fan was invented to inject air into the air mattress, but this device is very inconvenient and troublesome in such away that air has to be injected into air mattress via all intake holes of the mattress.
3. The conventional air mattress doesn't posses the protective function of automatic pressure release. As such, the mattress can be easily broken if the weight on the mattress increases abruptly.
4. Electric exhaust (intake) fan cannot inflate the air mattress fully. When user shuts off the valve after injecting air into the mattress, some air will be leaking from the mattress.

To solve these problems, the inventor presents this invention to the general public and hopes that the present invention will benefit us all.

DETAILED DESCRIPTION OF THE PREFERRED EMBODIMENT

Figure 1:
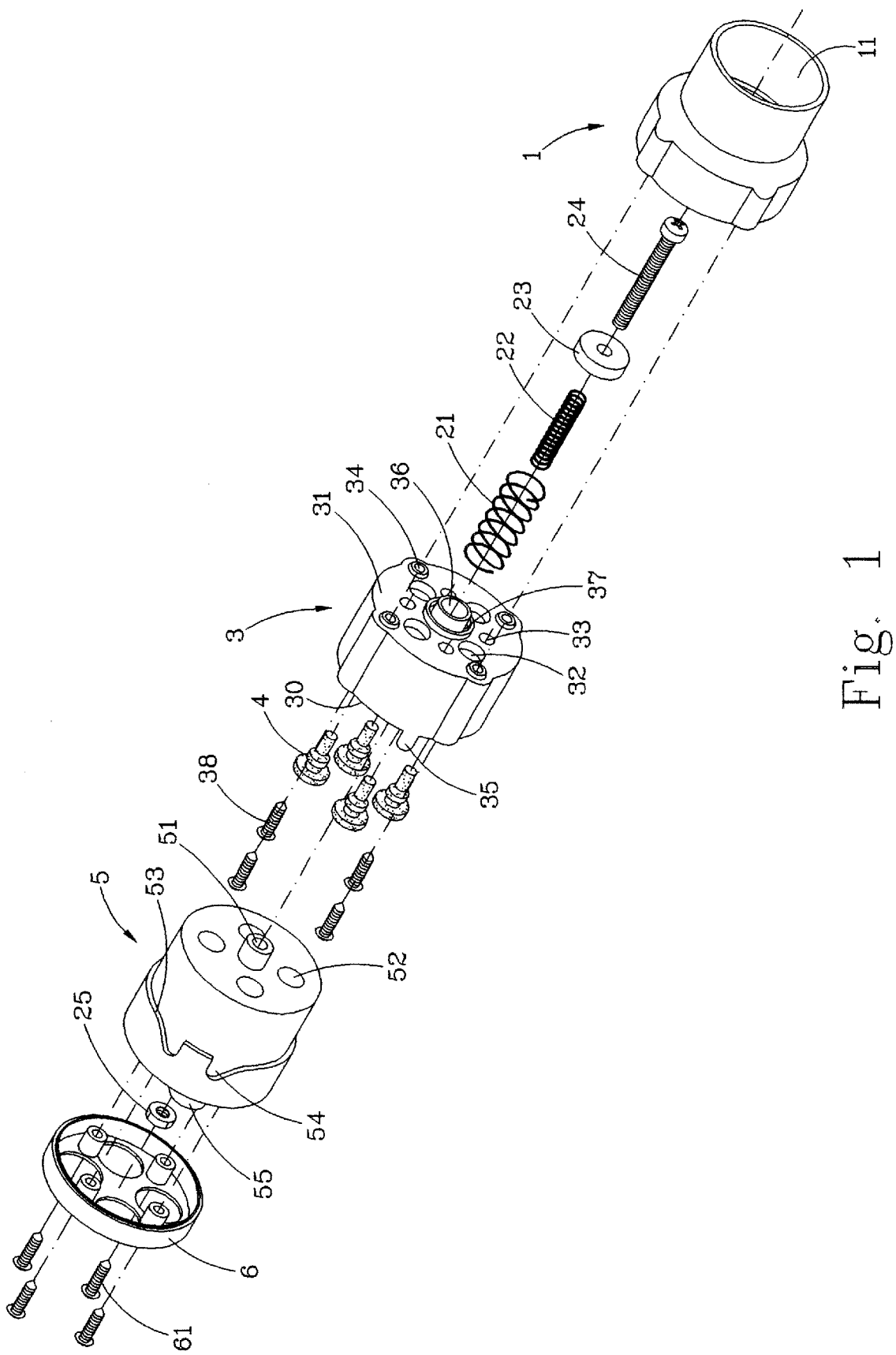
FIG. 1 is a three-dimensional analytic diagram of present invention.
Figure 2:
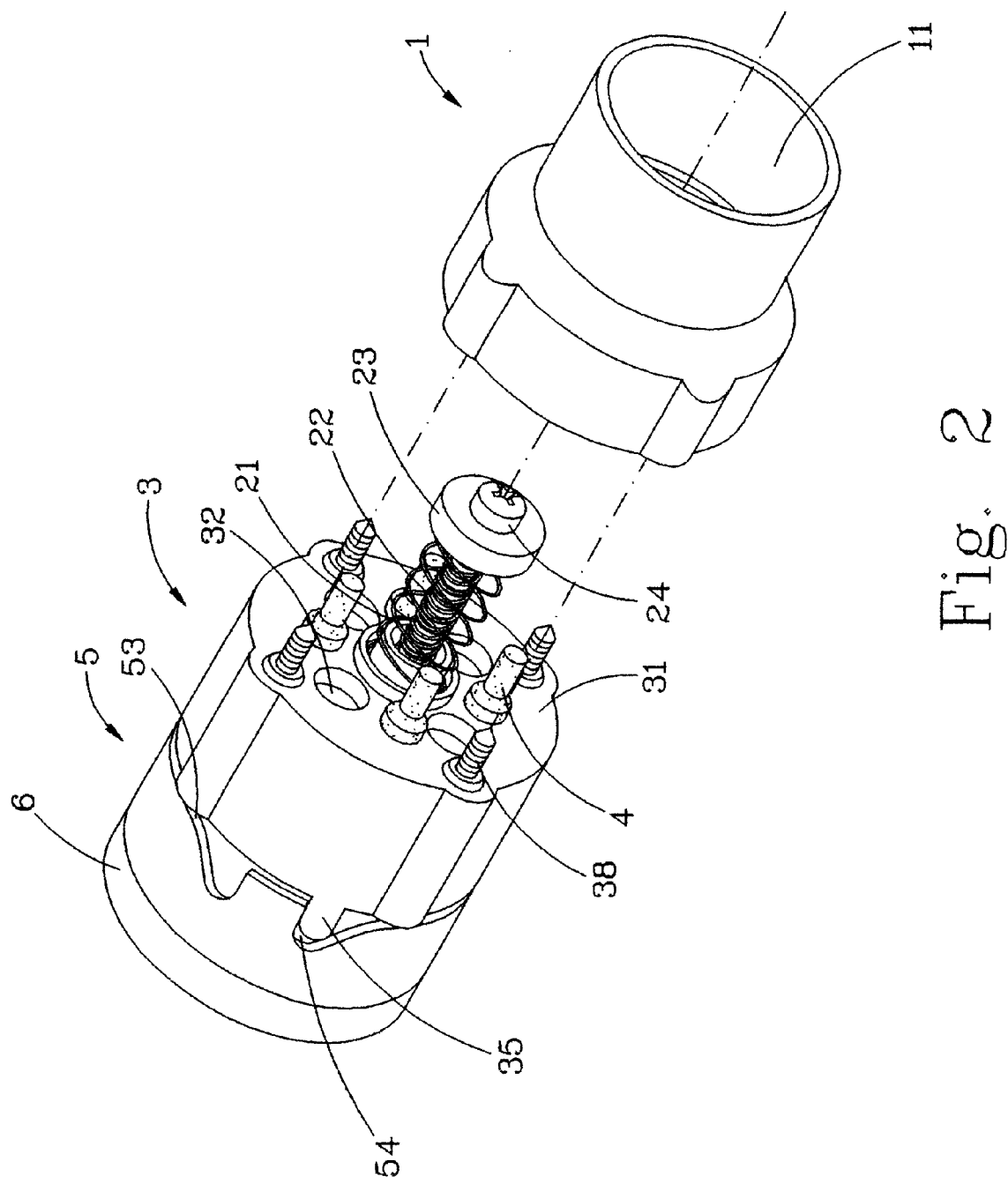
FIG. 2 is a three-dimensional block diagram of present invention.
Figure 3:
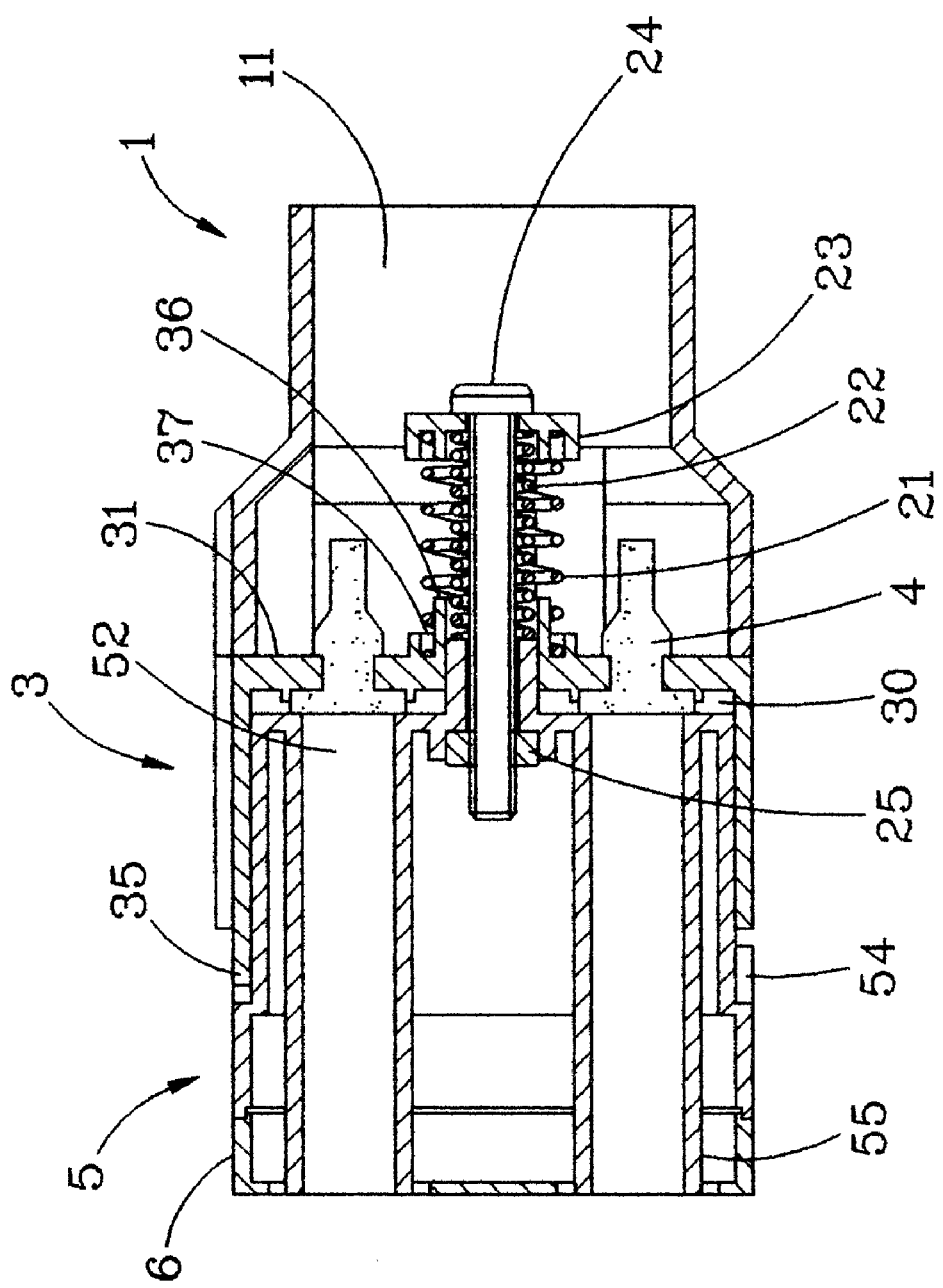
FIG. 3 is a sectional structural diagram of present invention.

Based on the structure of present invention, the benefits generated by present invention, and referring to the diagrams, following description shall illustrate the progressiveness and practical value of present invention:

As shown by FIG. 1, FIG. 2 and FIG. 3, the air valve of present invention is constituted by first main body 1, second main body 3 and third main body 5. Of which:

The first main body 1 is a slightly hollow tube with a joint on one end 11. This joint 11 can be connected with electric exhaust (intake) fan 8, while the other end can be connected with second main body 3;

The second main body 3 is slightly cylinder-shaped with one end closed 31 and the other end hollow 30. There is a hole 36 on the center of the closed end 31. A positioning ring 37 is installed on the edge of center hole 36. Openings for ventilation 32 and piercing holes 33 are made with proper distance between them together with screw hole 34. Each piercing hole 33 is stuffed by a stuffing object 4. On the same edge of second main body 3, there are two convex objects 35 facing each other;

The third main body 5 is slightly cylinder-shaped with a piercing hole 51 on its center. There are several openings for ventilation 52 on its edge. The position of opening for ventilation 52 corresponds to the opening for ventilation 32 or piercing hole 33. There is a sliding track 53. On the sliding track 53 there is a positioning chute 54.

With the major structure in mind, we stuff the stuffing objects 4 into all piercing holes 33 of second main body 3 and place a major spring 21 on the positioning ring 37 first, then insert a bolt 24 through blocking plate 23, and place minor spring 22 thorough the center piercing hole 36 of second main body 3 and the center piercing hole 51 of third main body 5, and then we use a nut 25 to tighten bolt 24 to complete the combination of second main body 3 and third main body 5. The first main body 1 and second main body 3 are combined by screw 38 going through screw hole 34.

For the outer cover 6, we use screw 61 to fix it on the edge of third main body 5.

To close the valve, we disconnect the opening for ventilation 52 and opening for ventilation 32. When opening for ventilation 52 is covered by the stuffing object 4 of piercing hole 33, the opening for ventilation 52 will be closed. At this time, we are assured that the air valve is closed (as shown by FIG. 3)

Figure 4:
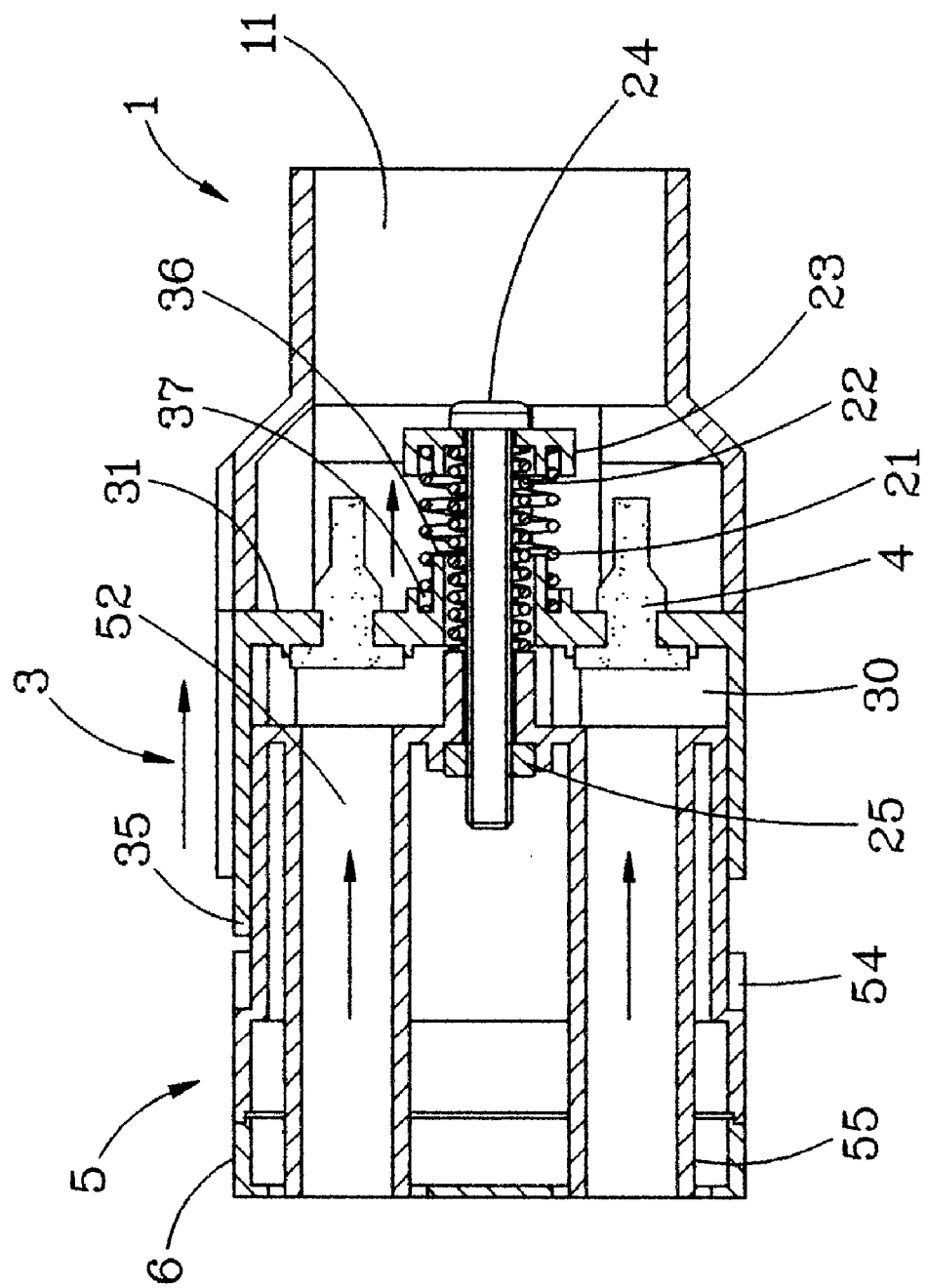
FIG. 4 is a motion sectional diagram of present invention.

Regarding the function of automatic releasing pressure, as shown by FIG. 4, automatic pressure release function is triggered when the air pressure from the mattress is sufficient to compress major spring 21. At this time, the major spring 21 functions. When the internal pressure is larger than the elastic force of major spring 21, the second main body 3 and first main body 1 will be forced to the right as described in the figure; and thus the internal air will be released from opening for ventilation 32 via the opening for ventilation 52. That's how the automatic pressure release works. As regards the adjustment of pressure for pressure release, it can be done by winding bolt 24 to change the elasticity of major spring 21.

Figure 5:
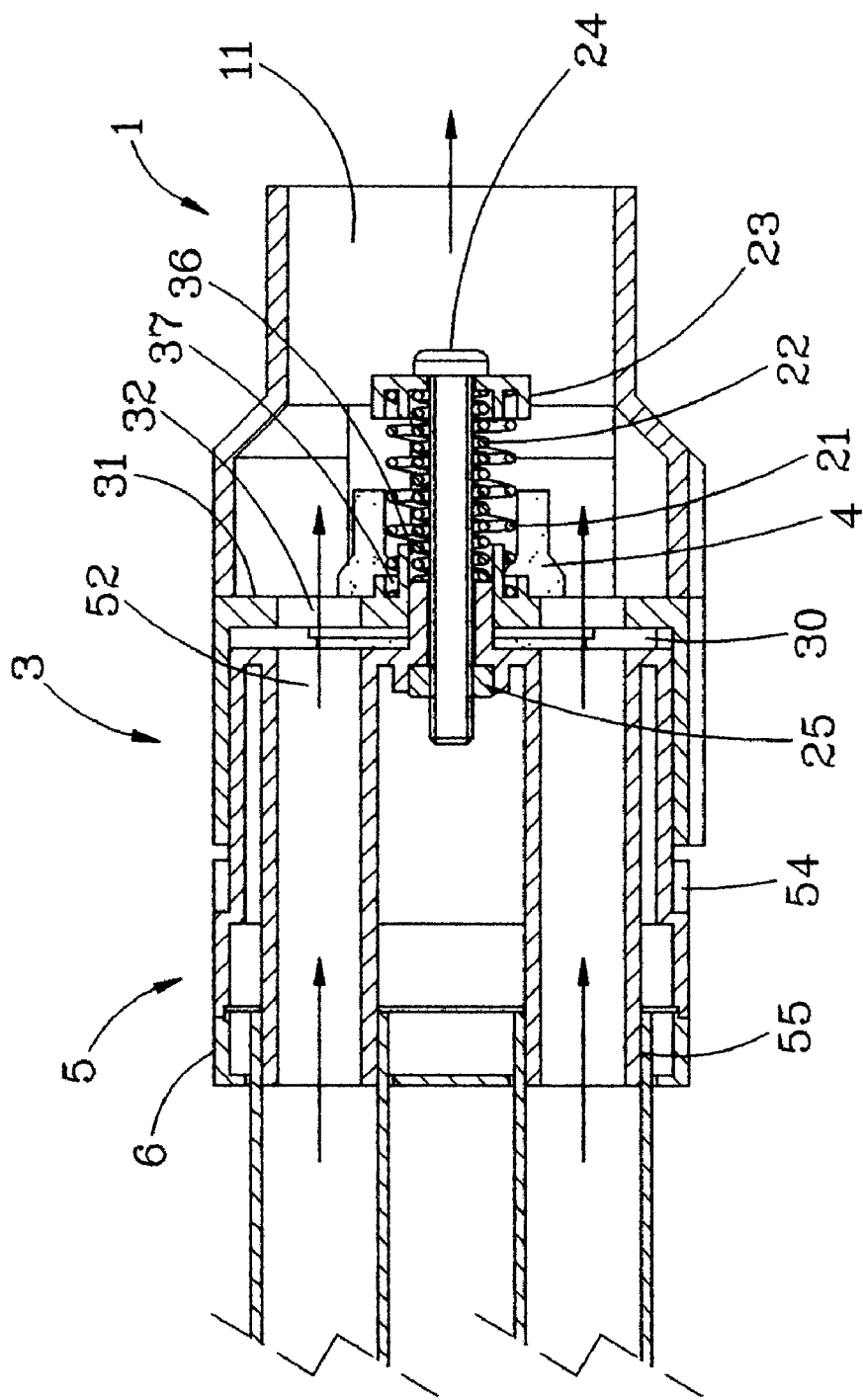
FIG. 5 is an execution status diagram of present invention.
Figure 6:
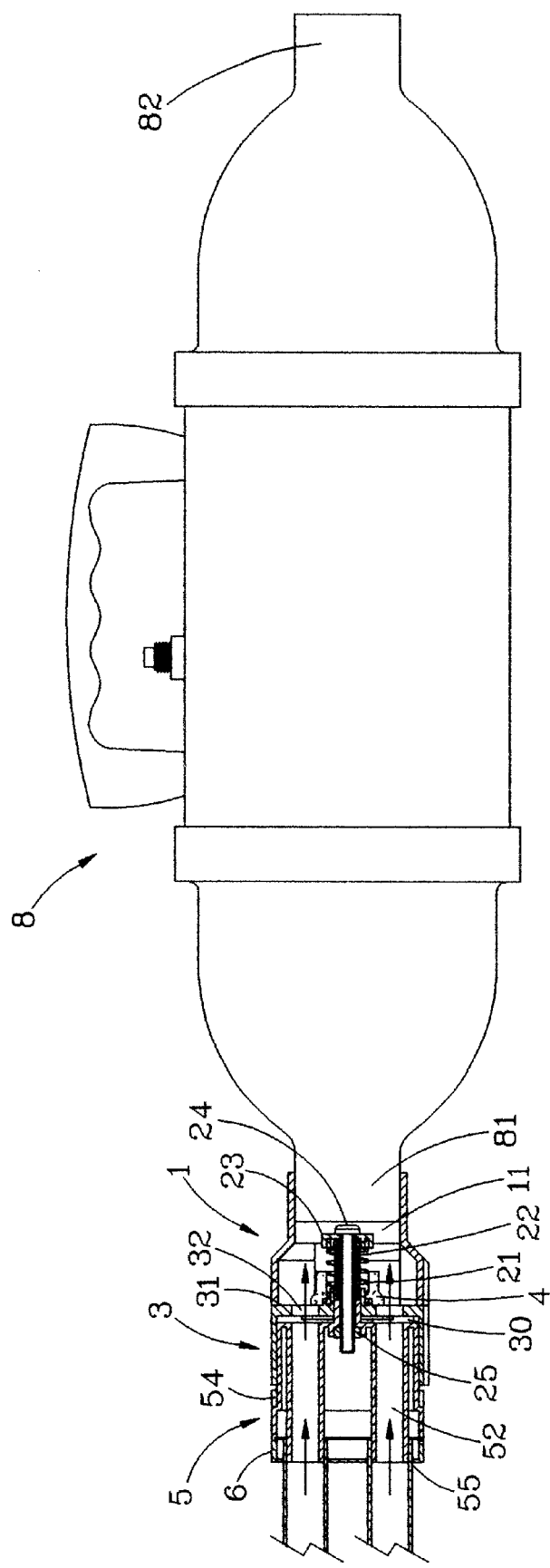
FIG. 6 is an execution example of present invention.
Figure 7:
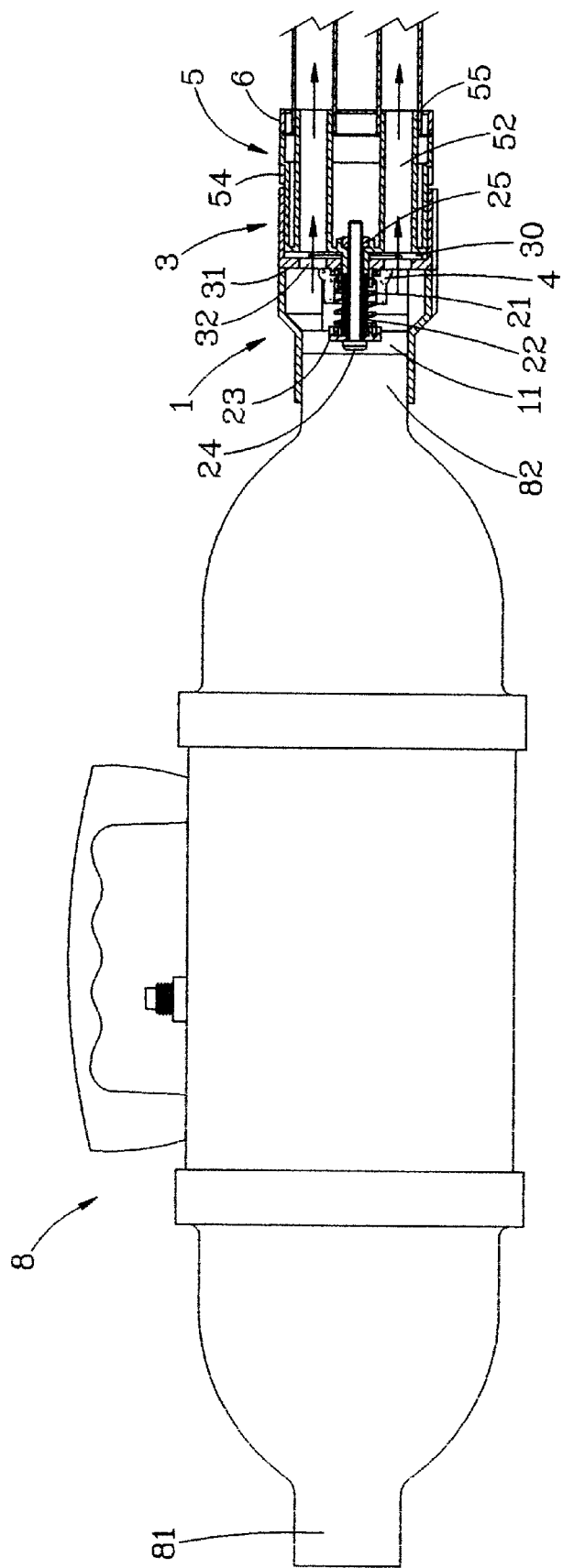
FIG. 7 is another execution example of present invention.

To release air or inject air, as shown by FIG. 5, connect the opening for ventilation 52 and the opening for ventilation 32 to open the air valve. At this time, the air is free to flow. Now we can use the electric exhaust (intake) fan 8 as shown by FIG. 6 to inject or release air. To release air, turn the sucking side 81 of electric exhaust (intake) fan 8 to face the joint 11 of first main body 1 for rapid release of air. To inject air, turn the absorbing side 82 of electric exhaust (intake) fan 8 to face the joint 11 of first main body 1 for rapid injection. The present invention works very fast. When injection of air is about to be complete, turn the second main body 3 to close air valve. The air valve will be closed immediately. No air will be leaked, and the mattress will be fully inflated.

We can open or close the air valve by winding the second main body 3. As the third main body 5 is fixed, we can use the sliding track 53 to control the second main body 3 by winding.

As the present invention is equipped with the minor spring 22 and blocking plate 23, the setup of major spring 21 will not be affected no matter how we wind the second main body 3.

Based on the preceding statement, the multiple-purposed air valve component for air mattress possesses a variety of functions and is the first invention in this industry. The practicability of present invention illustrates its progressiveness and practical value. The present invention has never been publicized in the archives and market domestically and internationally. With its outstanding performance, the present invention meets the requirements of creativity, practicability and progressiveness.

Having thus described the present invention, I pray that said invention be reviewed based on its usefulness and creativity and my claim:

1. An air valve for an air mattress comprising:

a first main body comprising a first end including an inlet/outlet opening to receive and exhaust air and a second end with a first receiving means, a second main body comprising a first end that is received in said first receiving means of said first main body and a second end with a second receiving means, said first end of said second main body comprises at least one plugging means and at least one ventilation hole in communication with said inlet/outlet opening, and a third main body comprising a first end with at least one ventilation hole and a second end that includes an air passage in communication with the air mattress; wherein said second main body is secured in said first receiving means, said third main body is rotatably received in said second receiving means; such that in a closed position, each said plugging means of said second main body is aligned with a corresponding ventilation hole of said third main body so that each said plugging means prohibits air from flowing through said corresponding ventilation hole, thereby prohibiting air from flowing through said inlet/outlet opening, and in an open position, each said ventilation hole of said second main body is aligned with a corresponding ventilation hole of said third main body so that said air valve allows air to flow through said inlet/outlet opening, said air valve being moved between said closed position and said open position by rotating said second main body relative to said third main body.

2. The air valve defined in claim 1 wherein:

said second main body comprises a socket and a positioning ring, and said third main body comprises a protrusion, and a release spring is mounted in said position ring, and said protrusion of said third main body is received in said socket of said second main body, said second main body being retractably secured to said third main body by a securing means passing through said release spring; such that when said air valve is in said closed position and pressure from the air mattress is sufficient to compress said release spring, said second main body moves away from said third main body so that each said plugging means is removed from each said corresponding ventilation means, thereby allowing air to flow through said inlet/outlet opening.

3. The air valve defined in claim 2 wherein:

said securing means is a threaded connector, an amount of pressure being required to compress said release spring being adjusted by tightening and loosening said threaded connector.

4. The air valve defined in claim 1 wherein:

said second end of said second main body includes at least one protuberance thereon, and an exterior of said third main body comprises a sliding track that receives said at least one protuberance therein, said sliding track comprising at least one lowered position and at least one elevated position; such that when said second main body is rotated relative to said third main body, said protuberance follows said sliding track so that said second main body is lifted away from said third main body, thereby removing each said plugging means from each said corresponding ventilation means, allowing air to flow through said inlet/outlet opening.

* * * * *